United States Patent [19]

Parks et al.

[11] Patent Number: 4,829,812

[45] Date of Patent: May 16, 1989

[54] DEVICE FOR ASSESSING PROCESSING STRESSES

[75] Inventors: Raymond Parks; George Anderson, both of Edinburgh, Scotland

[73] Assignee: The Minister of Agriculture, Fisheries and Food in her Britannic Majesty's Government of The United Kingdom of Great Britain and Northern Ireland, London, England

[21] Appl. No.: 112,220

[22] Filed: Oct. 26, 1987

[30] Foreign Application Priority Data

Oct. 27, 1986 [GB] United Kingdom ............... 8625686

[51] Int. Cl.$^4$ .............................................. G01N 3/08
[52] U.S. Cl. ...................................... 73/12; 310/800; 310/328; 310/330
[58] Field of Search .......................... 73/770, 768, 12; 310/338, 340, 311, 345, 348, 369, 800, 328, 330

[56] References Cited

U.S. PATENT DOCUMENTS

| | | | |
|---|---|---|---|
| 3,312,188 | 4/1967 | Lode et al. | 73/12 |
| 3,369,521 | 2/1968 | Meeder, Jr. | 73/12 |
| 3,373,716 | 3/1968 | Williams | 73/12 |
| 3,380,294 | 4/1968 | Redmond | 73/12 |
| 3,744,300 | 7/1973 | Fleury | 73/770 |
| 4,304,126 | 12/1981 | Yelke | 310/338 |

FOREIGN PATENT DOCUMENTS

| | | | |
|---|---|---|---|
| 0002161 | of 0000 | European Pat. Off. . | |
| 244863 | 12/1985 | Japan | 73/12 |
| WO84/02121 | of 1984 | PCT Int'l Appl. . | |
| 680311 | 10/1952 | United Kingdom | 73/770 |
| 1378633 | of 1973 | United Kingdom . | |
| 1354865 | of 1974 | United Kingdom . | |
| 1592416 | of 1977 | United Kingdom . | |
| 2001765A | of 1978 | United Kingdom . | |
| 2042256 | of 1979 | United Kingdom . | |
| 2144308A | of 1983 | United Kingdom . | |
| 2153627A | of 1984 | United Kingdom . | |

OTHER PUBLICATIONS

Vrlkelis, "IBM Technical Disclosure Bulletin", Piezoelectric Transducer, vol. 6, No. 8, Jan. 1964.

Primary Examiner—Stewart J. Levy
Assistant Examiner—Robert R. Raevis
Attorney, Agent, or Firm—Nixon & Vanderhye

[57] ABSTRACT

A device for assessing stresses in mechanical processing of agricultural or manufactured products has a core 11 and, adjacent to the surface a layer of piezo-electric plastic material 13. The device has physical characteristics simulating those of the product. In use the device is included in a batch of products being processed and the piezo-electric signals caused by the stresses are analyzed by electronic equipment either external to or contained within the device to locate when and where damaging stresses occurred.

14 Claims, 1 Drawing Sheet

DEVICE FOR ASSESSING PROCESSING STRESSES

FIELD OF THE INVENTION

The present invention relates to devices for assessing the levels of damaging or potentially damaging stresses applied to products during mechanical processing. Devices according to the invention may be used in connection with agricultural products such as potatoes or apples, or in connection with manufactured products such as bottles or light bulbs; for convenience devices for use with agricultural products will be discussed herein.

BACKGROUND OF THE DISCLOSURE

In modern agriculture most products are subjected to a great deal of mechanical processing before reaching the market place. For example, a product might be mechanically harvested, graded, and several times stored and then transferred to a transport system. During this processing a significant proportion of produce is damaged to such an extent that it is not of merchantable quality when it reaches the market place. There is therefore continual interest in improving machinery to reduce the stresses applied. However there is also an interest in increasing the speed of operation of the machinery, and the two interests are inherently contradictory.

One of the problems in reducing the damage caused by machinery is identifying what stresses actually cause damage—for example impact stresses between two products, impact stresses between product and machinery, or shear stresses—and where these occur. In attempts to identify the nature and location of stresses occurring during mechanical processing of products mock products (herewith referred to as packages) have been fabricated and subjected to the processes. Each package has been designed to have physical characteristics such as shape similar to those of the associated product, has contained either a pressure transducer or an accelerometer and either means for radio-telemetering or means for storing information for analysis.

Many packages have been developed and reports of their sucessful testing published. However there has been a scarcity of publications disclosing useful results. It appears, therefore, either that the signals provided by the transducers or accelerometers used do not correlate with damage found on the product or that analysis of the telemetered or stored signals has proved impossible.

SUMMARY OF THE INVENTION

According to the present invention a device simulates a product, said product having a surface of substantially surface of revolution shape comprising: a package, said package having a core which is toroidal in shape, said core being substantially covered by a layer of piezo-electric plastic material; said piezo-electric plastic material being connected to electronic processing equipment; said package having physical characteristics similar to those of the product.

Piezo-electric plastic materials are commercially available.

In a preferred form of the invention the package includes a doughnut-shaped core, with the layer of piezo-electric plastic material being formed from a piezo-electric plastic cable wound toroidally round the core. The core preferably has an elliptical cross-section with an axis ratio of slightly greater than 2:1.

The core is preferably formed from a rigid material such as a rigid foam plastic with a layer of compliant material separating the rigid material from the piezo-electric plastic layer.

The electronic processing equipment can be external to the package, being connected to the piezo-electric plastic material by an umbilical cord, but is preferably contained within the package. It can be arranged to telemeter or to store information but in a preferred arrangement is adapted to provide readings of a maximum stress-level and a time at which this is experienced. In one form of this arrangement the electronics monitor a number, for example eight, of threshold levels and record the time at which the highest threshold is triggered. The results may be displayed digitally using an LED or liquid crystal display.

BRIEF DESCRIPTION OF THE DRAWINGS

One embodiment of the invention will now be described, by way of example only, with reference to the accompanying diagrammatic drawings, of which.

DETAILED DESCRIPTION OF EMBODIMENTS

Figure 1:
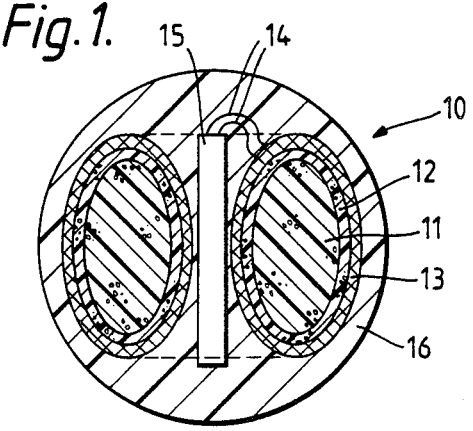
FIG. 1 is an elevation, in section, of an embodiment of the invention.

FIG. 1 illustrates a package 10 simulating a Bramley apple with the package having a core 11, which is toroidal in shape, of elliptical cross-section, formed from a rigid foam plastic material. The core is covered by a layer 12 of compliant foam plastic material, over which is helically wound a piezo-electric plastic cable 13. The cable 13 is connected by wires 14 to electronic processing equipment in the form of an electronic pack 15. The doughnut shaped core 11, 12, 13 and electronic pack 15 are surrounded by a layer 16 of resilient material adapted to give the package 10 physical characteristics as close as possible to those of a Bramley apple.

Figure 2:
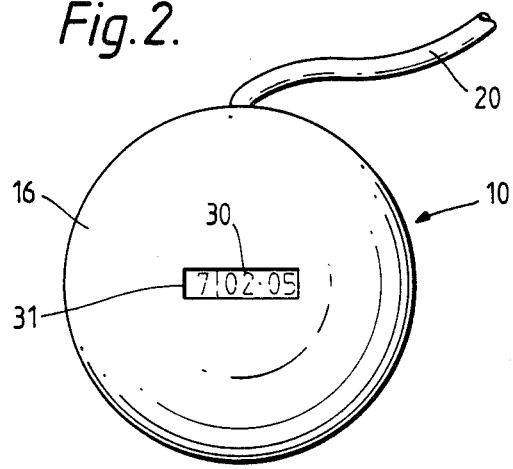
FIG. 2 is a perspective view of the embodiment of FIG. 1.

The electronic pack 15 is connected to a display unit. The connection might be (FIG. 2) to an external unit (not shown) by means of an umbilical cord 20. Alternatively the package 10 may have a digital display 30 visible through a transparent portion 31 of the layer 16 of resilient material.

The use of a package 10 according to the invention will now be described with reference to a package 10 in which the electronic pack 15 is adapted to monitor eight threshold levels and to record the highest threshold, and the time at which it is triggered, on a digital display 30.

Figure 3:
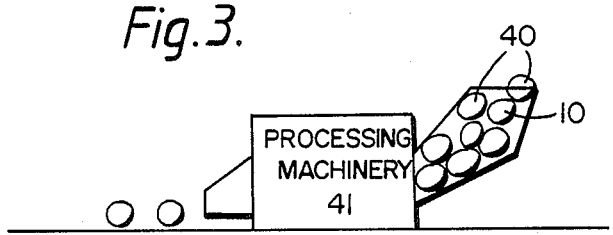
FIG. 3 is a schematic view partially in section of processing machinery utilizing the present invention.

The package 10 is mixed with Bramley apples 40 and the mixture is passed through processing machinery 41 shown in FIG. 3.

After passing through the machinery the digital display reveals the highest stress threshold exceeded—illustrated as 7—and the time—illustrated as 2 min 0.5 secs—after the start of the process at which the threshold was exceeded. This enables the position in machinery where maximum stresses occur to be identified.

In some instances where products proceed through machinery at an uneven rate it may be necessary for an observer to keep a timed record of progress of the package.

It will be realised that many alternative embodiments of the invention are possible. For example the electronic pack 15 has been described as being adapted to provide a single reading of stress level and time. It may be desired to obtain a continuous record of stresses experienced throughout a process. Electronic packs having telemetering or recording capabilities, well known in the art and hence not described in detail herein, can readily be adapted for use with the invention.

It will also be realised that for the purposes of this specification the word toroidal, as applied to the core 11, is used to cover shapes other than those fulfilling the strict geometrical definition. The curvature of the outward and inward facing surfaces of the core 11 will usually be different and the inward surface may, in some cases be partially cylindrical.

As an alternative to the helically wound cable 13, sheet piezo-electric material may be used, and this may cover only the outer facing surface of the core 11.

What is claimed is:

1. A device for assessing the levels of damaging or potentially damaging stresses experienced by a product during mechanical processing, said product having a surface of substantially surface of revolution shape comprising:
   a package;
   said package having a core which is toroidal in shape;
   said core being substantially covered by a layer of piezo-electric plastic material;
   said piezo-electric plastic material being connected to electronic processing equipment;
   said package having physical characteristics similar to those of said product.

2. A device as claimed in claim 1 wherein said layer of piezo-electric plastic material is formed from piezo-electric plastic cable wound helically round the core.

3. A device as claimed in claim 2 wherein said core has an elliptical cross-section.

4. A device as claimed in claim 3 wherein said core has an axis ratio slightly greater than 2:1.

5. A device as claimed in claim 1 wherein said core is formed from rigid material with a layer of compliant material separating the rigid material from said piezo-electric plastic layer.

6. A device as claimed in claim 1 in which said electronic processing equipment is adapted to give a single reading.

7. A device as claimed in claim 6 wherein said reading is of a stress level and a time.

8. A device as claimed in claim 7 wherein said stress level is obtained by triggering the relevant one of a number of threshold levels.

9. A device as claimed in claim 1 wherein said electronic processing equipment is adapted to telemeter a continuous record of stress.

10. A device as claimed in claim 1 wherein said electronic processing equipment is adapted to keep a continuous record of stress.

11. A method of determining a position of occurrence of damaging stress in processing machinery wherein a device as claimed in claim 1 is included in a batch of products being processed by the machinery.

12. A device for assessing the levels of stresses experienced by a product during mechanical processing of said product, said product having a surface comprised of a surface of revolution, said device comprising:
    a package, said package having a core which is toroidal in shape;
    means for covering said core with a layer of piezo-electric plastic material;
    electronic processing equipment;
    means connecting said electronic processing equipment to said layer of piezo-electric material, said electronic processing equipment, said means for connecting, said package and said core comprising a means for simulating the external physical characteristics of said product.

13. A device as claimed in claim 12, wherein said electronic processing means comprises a means for transmitting a continuous record of stress.

14. A method of determining the location of stress applied to a product in a product processing machinery comprising the steps of:
    substituting a device for one of said products processed by said machinery, said device comprising:
    a package having a core which is toroidal in shape, said core being substantially covered by a layer of piezo-electric plastic material;
    electronic processing equipment and means connecting said processing equipment to said piezo-electric plastic material, said package, core, piezo-electric plastic material, electronic processing equipment all comprising a device having external physical characteristics similar to those of said product;
    processing said products including said device with said processing machinery; and
    analyzing stress information provided to said electronic processing equipment by said piezo-electric plastic material during said processing.

* * * * *